July 7, 1970 D. A. HARMS 3,519,756

MULTIPLEX SIGNAL TRANSFER SYSTEM

Filed April 6, 1967 3 Sheets-Sheet 1

INVENTOR
D. A. HARMS
BY
ATTORNEY

United States Patent Office 3,519,756
Patented July 7, 1970

3,519,756

MULTIPLEX SIGNAL TRANSFER SYSTEM

David A. Harms, Wheaton, Ill., assignor to Bell Telephone Laboratories Incorporated, Murray Hill and Berkeley Heights, N.J., a corporation of New York Filed Apr. 6, 1967, Ser. No. 628,969
Int. Cl. H04j 3/02
U.S. Cl. 179—18 22 Claims

ABSTRACT OF THE DISCLOSURE

A multiplex signal transfer circuit for a communication system is disclosed in which signals for transmission between lines in communication are coded in binary form. Stored designations of all of the communicating lines are scanned in sequence during a repetitive cycle. Signal transfer is effected by altering a charge stored in each line coding and decoding circuit during each cycle dependent upon the type of coding circuit output signal detected during the cycle.

BACKGROUND OF THE INVENTION

In a typical time division multiplex switching system, delta modulation techniques may be employed for coding and decoding of signals transmitted through the system. A conventional delta modulation system comprises a coder which converts analog intelligence signals to binary coded "ones" and "zeros." The amplitude of the intelligence signal determines the number of "ones" and "zeros" provided at the output of the coder. By means of a feedback circuit, each sample of the output signal from the coder is compared with a representation of the preceding sample which has been demodulated in an integrating capacitor in the feedback circuit. If the coder signal sample is larger than the feedback signal sample, the coder output will be in a "zero" state.

A time slot is assigned to each active line and a delta signal sample (either a "one" or a "zero") is transmitted directly between the communicating pair of lines in the assigned time slot in each repetitive cycle of time slots. This, of course, requires that a finite time interval be allotted each pair of communicating lines in each cycle of operation, irrespective of whether or not an intelligence signal is available for transfer. The sampling frequency of the system determines the maximum signal to quantizing noise ratio. The requisite sampling rate depends upon both signal frequency and amplitude.

Such a system necessarily is synchronized so that one of a pair of communicating lines can be sampled in a particular time slot and the other line in the pair can receive the signal sample in a predetermined time slot in the same or a later cycle of time slots or frame, depending upon the transmission delay encountered in the system. Time slots are assigned to the communicating lines in sequence in each frame. Thus an upper limit is placed on the number of simultaneous conversations which can be handled despite the fact that intelligence signals are not being transmitted during a large proportion of each frame.

SUMMARY OF THE INVENTION

In accordance with this invention, an asynchronous control arrangement is provided which assures that each time slot is occupied with an intelligence signal transfer. This is facilitated by the manner of signal transfer which is entirely different from that utilized in the prior art; in fact, no intelligence signals, coded or otherwise, are transmitted between lines in communication. Instead, a memory unit stores the designations of all communicating lines in the system, which designations are scanned repetitively in sequence. Outgoing intelligence signals from a line again are converted by a delta modulator, comprising the coder in each line circuit, into the usual binary "one" and "zero" pulses. However, instead of a direct conversion of the binary coded output pulse to analog form in the integrating capacitor of the feedback circuit according to conventional delta modulation practice, the feedback circuit now stores a predetermined charge which is appreciably larger than the output "one" pulse. The delta demodulator comprising the decoder in each line circuit also stores this predetermined charge. Upon recepit of an outgoing "one" pulse from a sending line circuit, the memory scan is stopped, and a first control signal is applied to the sending line circuit coder and to the receiving line circuit decoder to transfer the stored predetermined charge to the integrating capacitor in the respective coder and decoder.

In accordance with one embodiment, upon completion of the memory scan, a second control signal is transmitted to the coder and decoder of all communicating line circuits. This second control signal serves to reduce the predetermined charge on the integrating capacitor in the sending line circuit coder and in the receiving line circuit decoder to a level corresponding to the original coded outgoing signal sample. In those instances in which a "one" pulse is not received from a sending line circuit coder during the cycle, the control signal applied at the end of the cycle serves to store a quantity of charge corresponding to the "zero" pulse on the integrating capacitor of the sending line circuit coder and receiving line circuit decoder. In accordance with a second embodiment, the desired results are achieved by the utilization of a bleed-off resistance in conjunction with each integrating capacitor.

DRAWING

DETAILED DESCRIPTION

Figure 1:
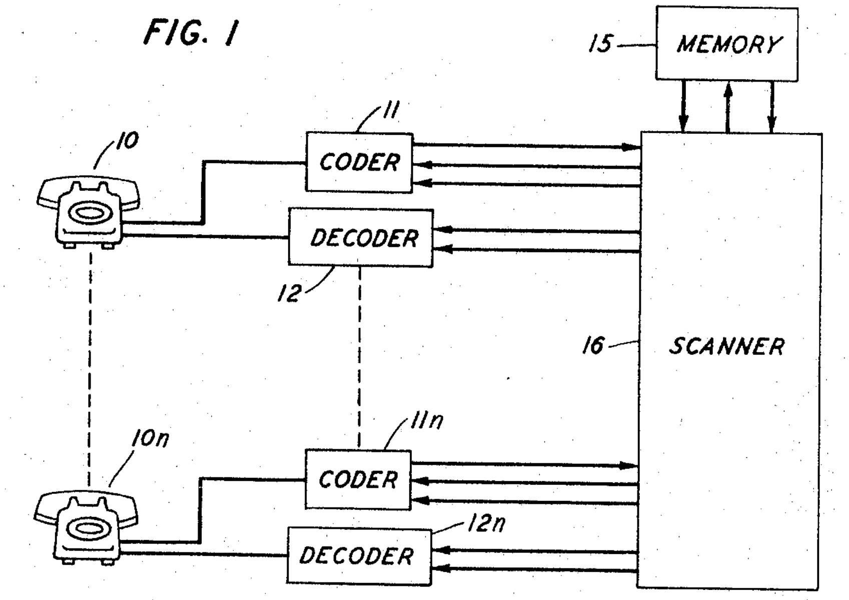
FIG. 1 depicts the elements of a communication system which are of interest with regard to one embodiment of this invention.

Turning now to FIG. 1, a communication system is shown which comprises a plurality of telephone stations 10—10$n$ each connected to common control circuitry through lines circuits consisting of corresponding coders 11–11$n$ and decoders 12–12$n$. Thus intelligence signals transmitted from one of the stations 10–10$n$ will be appropriately coded in the corresponding coder 11–11$n$ prior to receipt in the control circuitry. Similarly, intelligence signals corresponding to coded signals from the coder of another station will be received in stations 10–10$n$ after decoding in the corresponding decoder 12–12$n$ to place them in their original analog form. The system control circuitry essential to a disclosure of the invention consists of a memory 15 and a scanner 16. Memory 15 contains a coded designation of each station in the system currently in communication with another station. Such stations will be referred to hereinafter as "active" stations.

Scanner 16 comprises circuitry which automatically retrieves a pair of active station designations from memory 15 during a particular time interval designated hereinafter as a "time slot." Subsequent retrieval operations are delayed if at the time of retrieval of the pair of active station designations a coded intelligence signal of a particular type is received from the coder corresponding to one of the active stations. During the ensuing delay, a control pulse is applied to the coder from which the coded intelligence signal was received. The same control pulse is applied to the decoder of the other active station in the pair. The sequential scan of memory 15 by scanner 16 then is reinitiated.

If a pair of active station designations is retrieved without concurrent receipt of a coded intelligence signal of the particular type from one of the pair of lines, the scan operation is continued without delay. Thus a time slot is utilized only for stations between which the particular intelligence signals are being transmitted.

At the end of the scan through memory 15, a second control pulse is applied to all coders **11–11*n* and to all decoders 12–12*n*. Subsequent to this operation, will all of the designations in memory 15 are again scanned in sequence by scanner 16**. These then are the basic operations required for transfer of intelligence signals between stations of the communication system.

Figure 3:
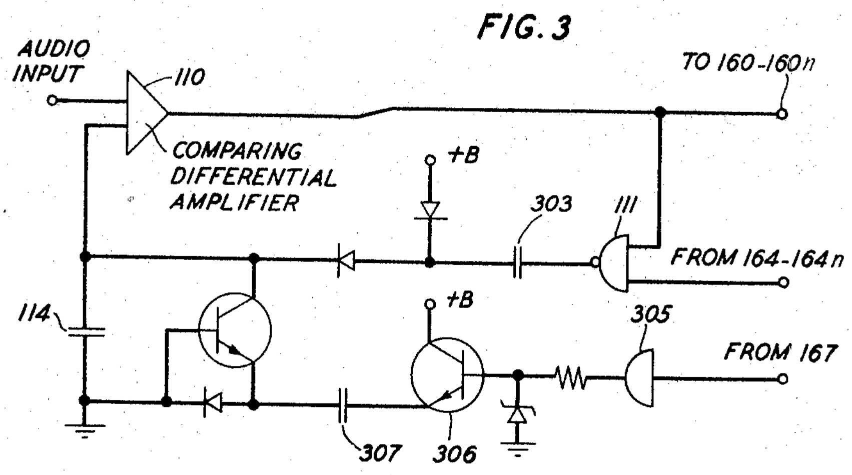
FIG. 3 depicts in schematic form a coding circuit suitable for use in the embodiment of the invention shown in FIG. 1.
Figure 4:
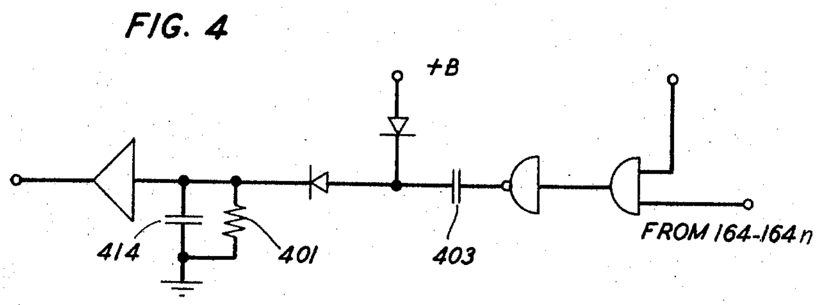
FIG. 4 depicts in schematic form a decoding circuit suitable for use in the embodiment of the invention shown in FIG. 1.
Figure 2:
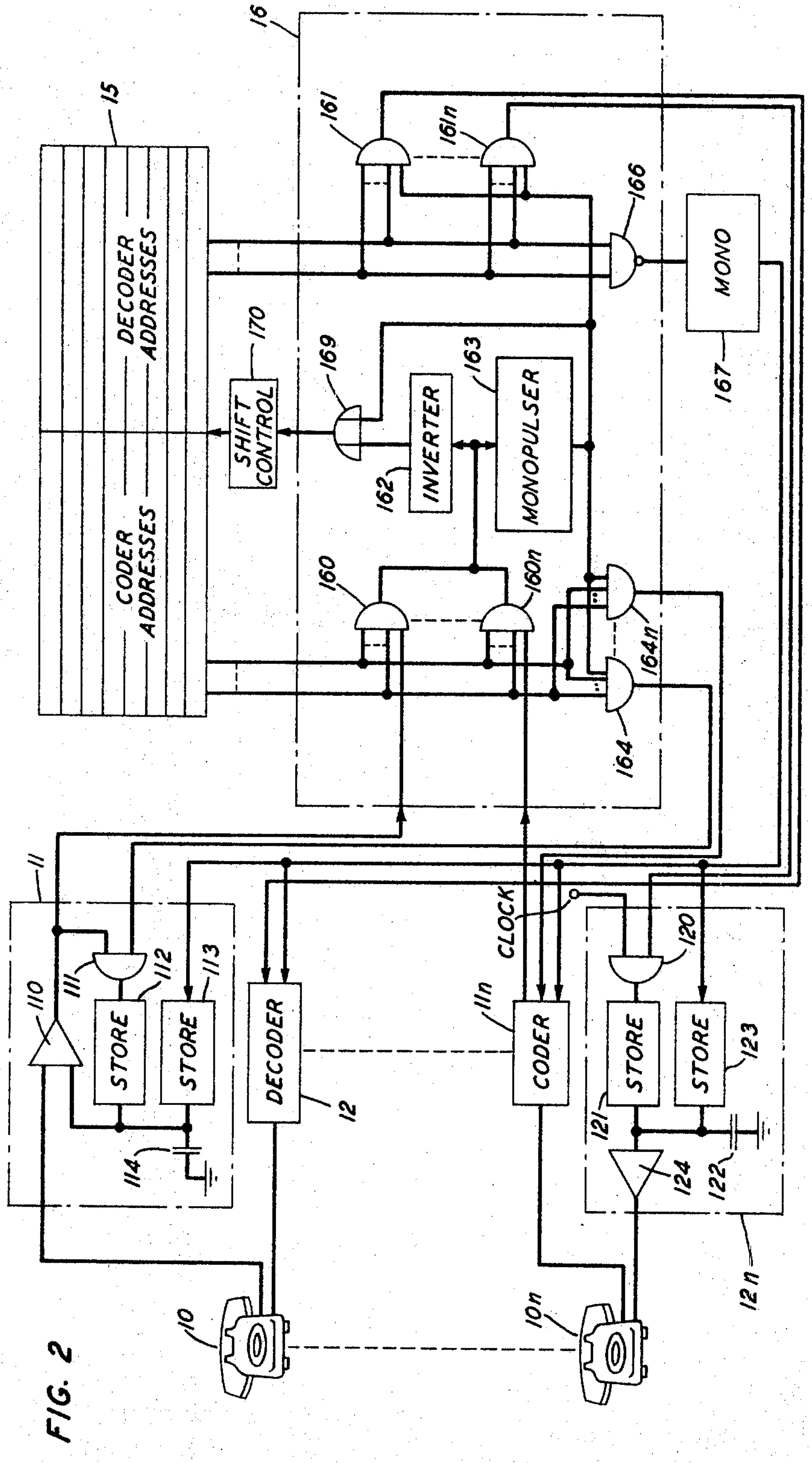
FIG. 2 illustrates certain of the elements depicted in FIG. 1 in greater detail.

The elements depicted in FIG. 1 are those essential to the particular signal transfer operations just described, and they are illustrated in more detail in FIGS. 2–4. Of course it should be recognized that a communication system comprises considerably more apparatus and circuitry than that disclosed. However, such circuitry, necessary to the establishment and supervision of call connections, is well known and readily available in the art. For example, a telephone system environment in which this signal transfer arrangement may be utilized is disclosed in H. Inose et al. Pat. 3,223,784, issued Dec. 14, 1965.

Turning then to FIG. 2, stations **10–10*n* are again depicted, together with the corresponding coders 11–11*n* and decoders 12–12*n*. In this instance memory 15 and scanner 16 are depicted in greater detail to illustrate the basic logic operations performed in realizing signal transfers between each pair of lines in communication. Memory 15 may comprise a conventional ring shift register containing the address of the coder corresponding to one of a pair of active lines, followed by the address of a decoder corresponding to the other active line in the pair. Thus in a given time slot the coder address for one active line is applied to the corresponding one of AND gates 160–160*n*, and the decoder address of the other active line in the pair is applied to the corresponding AND gate 161–161*n* in scanner 16**.

Let us assume, for example, that station 10 is in communication with station **10*n* and that scanner 16 has just retrieved the addresses of coder 11 and decoder 12*n* from memory 15 during a sequential scan of all of the stored addresses in memory 15. The address of coder 11 will be applied so as to enable AND gate 160 in conjunction with a particular signal, designated a "1" hereinafter, from coder 11**. A one out of *n* translation is performed at AND gates **160–160*n*. An output of AND gate 160 will activate monopulser 163 which in turn will enable AND gate 164 to apply a control signal to coder 11. Similarly, the address of decoder 12*n* will be applied so as to enable AND gate 161*n* in conjunction with the output of monopulser 163. The output of AND gate 161*n* will be applied to decoder 12*n* at the same time that the output from AND gate 164 is applied to coder 11. Thus in the current time slot a control signal is applied simultaneously to the coder of station 10, and to the decoder 12*n* of the station 10*n* with which it is in communication. In this way a "1" signal is applied to coder 11 and to decoder 12*n***.

Monopulser 163 also signals shift control logic 170 through OR gate 169 such that at the end of the time slot in which these control operations are performed, the ring counter in memory 15 will advance to the next pair of addresses corresponding to active lines in communication. If in this instance the coder corresponding to the coder address retrieved from memory 15 does not provide a concurrent "1" signal, the corresponding AND gate **160–160*n* will fail to provide an output signal. Inverter 162 will respond to the absence of a signal to activate shift control 170 through OR gate 169 so as to shift immediately to the succeeding pair of addresses in memory 15**.

Upon completion of a cycle through memory 15 during which time slots were assigned only to those line pairs in which a "1" signal was detected, a final address from memory 15 enables AND gate 166 to activate monopulser 167 which in turn provides another control signal to all of the coders **11–11*n* and to all of the decoders 12–12*n***.

Coders **11–11*n* each comprise the elements depicted in coder 11; viz, differential amplifier 110, AND gate 111, store 112 containing a predetermined quantity of charge which is larger than the analog equivalent of the "1" signal, store 113 containing a predetermined quantity of charge corresponding to the "0" signal and serving to reduce the charge in store 112 to a level corresponding to the "1" signal, and integrating capacitor 114**. These elements together form a delta modulator arrangement operating in accordance with this embodiment of the invention.

The control signal received from AND gate 164 at coder 11 is applied to AND gate 111 which in turn is enabled in conjunction with the "1" signal from differential amplifier 110. The output of AND gate 111 permits the storage in integrating capacitor 114 of the predetermined quantity of charge contained in store 112.

This charge on capacitor 114 is modified at the end of the cycle by the predetermined charge contained in store 113 which is applied to capacitor 114 upon receipt of the output of monopulser 167. The net effect is the application to differential amplifier 110 in coder 11 of a charge on capacitor 114 corresponding to the "1" output signal of the differential amplifier 110.

Of course it is also necessary that the "1" signal from coder 11 be transferred to decoder **12*n* for subsequent application to station 10*n*. Decoders 12–12*n* each comprise the elements depicted in decoder 12*n*; viz, amplifier 124, AND gate 120, store 121 containing a quantity of charge corresponding to that found in store 112, store 123 containing a quantity of charge corresponding to that found in store 113, and integrating capacitor 122**.

Thus the signal provided to decoder **12*n* from AND gate 161*n* in scanner 16 is applied through AND gate 120 to store 121, which in turn deposits its predetermined charge on capacitor 122. Against the end of the cycle, the output of monopulser 167 triggers store 123 to apply its charge to capacitor 122, the net effect of which is to provide the analog equivalent of the desired "1" signal at the input of amplifier 124. Upon receipt of an appropriate clock signal at this time, amplifier 124 is permitted to apply the resultant amplified analog signal to station 10*n***.

Continuing with the previous example, let us consider now that station **10*n* provides an intelligence signal which results in an output from coder 11*n* of a "0" signal. At the time scanner 16 retrieves the address of coder 11*n* and the address of decoder 12 from memory 15, the presence of this "0" signal will result in an immediate shift in memory 15 due to the failure of AND gate 160*n* to provide an output. Thus coder 11*n* and decoder 12 will fail to receive the first control signal. However, at the end of the cycle the output of monopulser 167 will be applied to all coders and decoders in the usual manner. In this instance the integrating capacitor in coder 11*n* will be charged to the "0" signal level. Similarly, decoder 12 receiving only the output of monopulser 167, will charge the corresponding integrating capacitor to a level which will permit the decoder amplifier to provide an analog signal to station 10 corresponding to the "0" signal provided by coder 11*n***.

The particular coder operation utilizing one form of integrating circuit is depicted in FIG. 3. Thus an analog signal received at one input of differential amplifier 110 is compared with the output of a circuit which includes integrating capacitor 114 and AND gate 111 plus the elements of stores 112 and 113 depicted in FIG. 2. The output of differential amplifier 110 together with a clocked address from memory 15, enables the corresponding AND gate of gates 160–160$n$ on FIG. 2 to provide the appropriate digital output signal "1" or "0." A "1" signal, together with a control signal from the corresponding AND gate 164–164$n$ in scanner 16, will enable AND gate 111 to transfer the charge from capacitor 303 to integrating capacitor 114. Similarly, receipt of the control signal from monopulser 167 at the end of a cycle at gate 305 will bias transistor 306 so as to transfer the charge stored on capacitor 307 to integrating capacitor 114. The net effect of the two charge transfers in this instance is to increment the charge on integrating capacitor 114 by an amount corresponding to the "1" signal previously provided by differential amplier 110. Of course if differential amplifier 110 provides a "0" output, AND gates 302 and 111 will not be enabled so that the charge on capacitor 303 will not be transferred to integrating capacitor 114 during the current cycle. The charge on capacitor 307 nevertheless will be transferred to integrating capacitor 114 at the end of the cycle such that the input to differential amplifier 110, which is the charge on capacitor 114, will be decremented by a signal corresponding to the previous "0" output.

A variation in the integrator which may be employed in the coders and decoders is depicted in FIG. 4. In this instance one of the storage circuits is eliminated and in its place the integrating capacitor 414 is shunted by a bleed resistor 401; capacitor 403 still serves, however, to transfer to the integrating capacitor 414 an incremental charge larger than the desired unit change in the signal on capacitor 414. With this arrangement the effective sampling frequency is controlled by the RC time constant of the integrator. The advantage of this arrangement may be seen by comparison with the previous arrangement depicted in FIG. 3. As previously described, each cycle of operation is followed by the application to each coder and decoder of a control signal from monpulser 167 in scanner 16, FIG. 2. This signal triggers the store 113 in each coder 11–11$n$ and the store 123 in each decoder 12–12$n$ to establish the proper charge level on the corresponding integrating capacitor such as 114 or 122. The arrangement depicted in FIG. 4 obviates the need for this action at the end of each cycle since, with a proper adjustment of the RC time constant, the charge on the integrating capacitor will automatically be reduced to the appropriate level at the end of each cycle.

With this arrangement, scanner 16 will only stop during the scanning cycle in the presence of a"1" signal from one of the coders. There is no longer any need to stop at the end of each scan in order to provide the monopulser output signal to each line. In this fashion another time saving is realized. Also the circuitry is simplified by removal of one of the store circuits from each coder and decoder as well as the scanner circuitry necessary to detect the end of a memory scan as well as monopulser 167.

Considerable difficulty is encountered in achieving proper fidelity in conventional time division multiplex communication systems of this type primarily because of the difficulty in achieving a sufficiently high sampling frequency. Thus the conventional system must be designed to provide a number of time slots corresponding to the maximum system loading. In addition, the time slots must be of sufficient duration to allow for propagation delays incurred during the transfer of coded intelligence signal samples. Assume, for example, that twenty-five nanosecond time slots are required for transfer of detal modulated signals through a 100 line system. Such a system would thus require 100 time slots to serve the maximum load. The time required for one cycle of operation is thus $2500\times10^{-9}$ seconds, and the resulting sampling frequency $$f_s=\frac{1}{2500\times10^{-9}}=400\text{ kHz}$$

This sampling frequency must be maintained whether one or fifty pairs of lines are in communication. Acceptable transmission requirements cannot be met at this frequency and, in fact, a frequency of approximately 2 mHz. would be more appropriate.

In accordance with embodiments of my invention, proper system fidelity is realized. The time required for a complete scan is the basic scanning time plus the time required for each of the time slots in which a "1" is transmitted. Also, if the end of scan control pulse is utilized with coders and decoders according to the arrangement depicted in FIG. 3, an additional interval per cycle will be required.

Assume, for example, that it requires three nanoseconds for the basic scan of each line to determine the presence of the "1" signal. If a "1" is present, a ten nanosecond time slot is provided for addressing the pair of lines involved. Again assuming a maximum loading of fifty simultaneous calls, the maximum time required for a complete (all "1's") scan will be:

| | Nsec. |
|---|---|
| Basic scanning | 100×3=300 |
| Time slots for "1's" | 50×10=500 |
| Time slot for control pulse | 10 |
| Total scanning time | 810 |

The sampling frequency $$f_s=\frac{1}{810\times10^{-9}\text{ sec.}}=1.235\text{ mHz}$$

With total integration, this sampling frequency is sufficient to meet system requirements for signal-to-noise ratio.

At one half load the memory would contain only fifty addresses to accommodate twenty-five calls. In this instance the time required for a complete (all "1's") scan would be:

| | Nsec. |
|---|---|
| Basic scanning | 50×3=150 |
| Time slots for "1's" | 25×10=250 |
| Time slots for control pulse | 10 |
| Total scanning time | 410 |

This results in a sampling frequency of 2.44 mHz. which is well above the level necessary to satisfy signal-to-noise requirements. It is evident from the foregoing that my arrangement can readily satisfy system requirements and, through its flexibility, can far exceed system requirements at low levels of system loading. Thus transmission quality may be determined by system loading, with a minimum satisfactory level established at maximum load.

Figure 5:
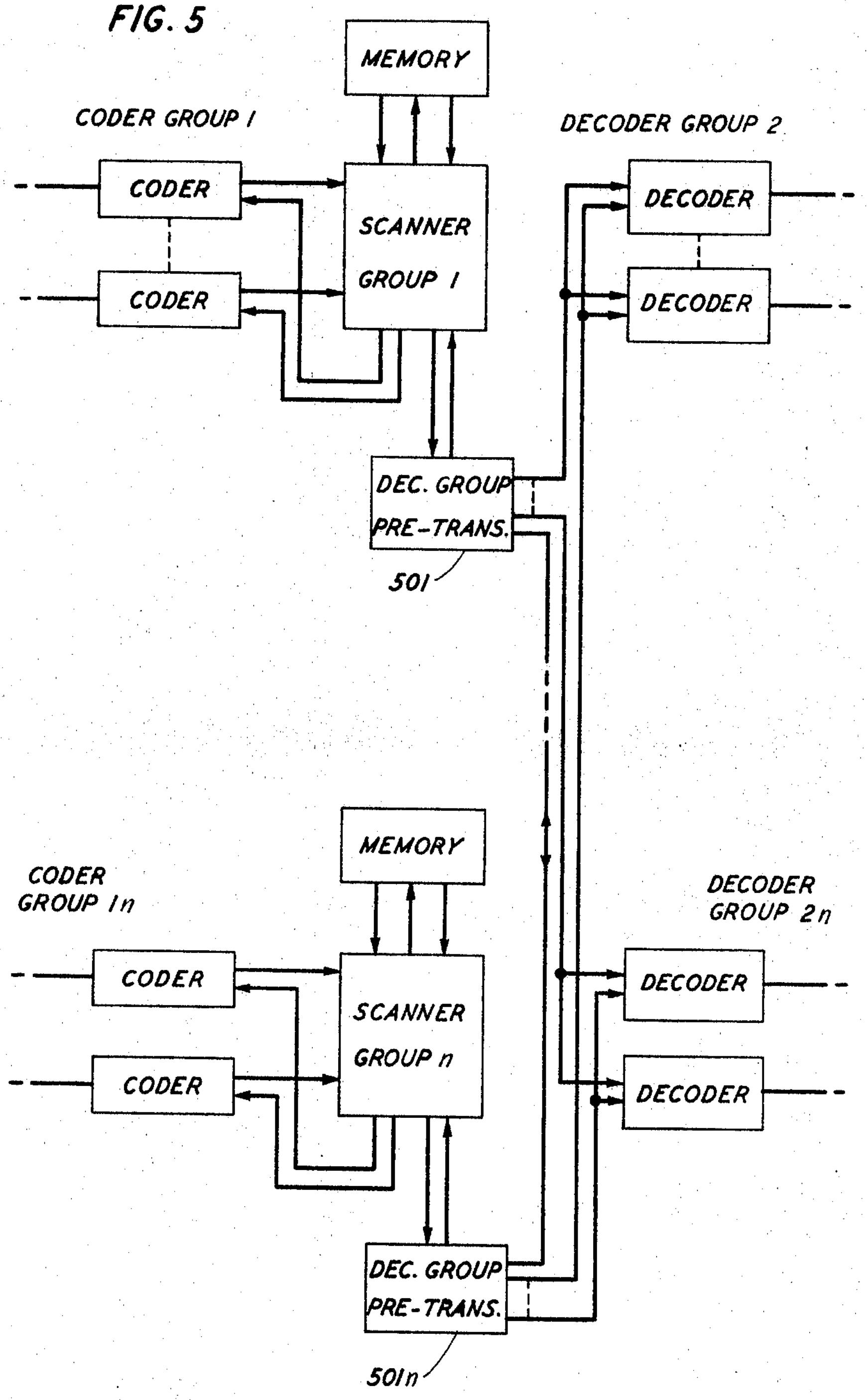
FIG. 5 illustrates a communication system which integates a number of the systems depicted in FIG. 1.

Larger systems may be provided utilizing the arrangement according to this embodiment of the invention by time multiplexing a number of such arrangements. Thus, as noted in FIG. 5, each of the coder groups 1–1$n$ is assigned to a distinct scanner and memory. Thus the coders in a particular group will be served only by the scanner and memory assigned to that group. The decoders are also arranged in groups; viz., groups 2–2n. However, the decoder grouping will not necessarily correspond to the coder grouping. In this arrangement only one decoder in a particular group can be addressed at a time. If a scanner has addressed a particular decoder group via the corresponding decoder group pretranslator 501–501$n$, facilities are available for inhibiting the simultaneous address of the same decoder group by another pretranslator. This operation, of course, will require a somewhat greater time slot duration to accommodate the propagation delay between a particular memory and the addressed decoder.

Also the inhibit signals between group pretranslators will automatically decrease the sampling frequency unless the memory loading is correspondingly decreased. The effective sampling rate also will be established independent of system loading by the RC time constant if bleed resistors are utilized and by the regular application of the end of cycle control pulse if this method of operation is adopted.

Another approach to a large system utilizing the concepts in accordance with this embodiment of the invention is to provide a group of memories each having access to a group of scanners through group pretranslators. The coder and decoder identities contained in each memory in this instance will require additional digits to denote the group to which the respective coder or decoder is assigned. The remaining digits will identify the particular coded or decoder within the group. The pretranslator utilizes the group identity to direct the address to the scanner associated with the appropriate group of coders. The scanner then interrogates the proper coder in the manner described hereinbefore. All memories have access to all group scanners and the first memory to obtain the use of a particular scanner will inhibit the use of this scanner by any other memory until the desired interrogation has been completed. The decorer outputs of a scanner include the identity of a decoder group and the output of a decoder group pretranslator indicates whether or not this decoder group is in use. If it is, the signal inhibits this scanner's further use. A hold is applied to waiting scanners until the group is available.

It is to be understood that the above-described arrangements are illustrative of the application of the principles of the invention. Numerous other arrangements may be devised by those skilled in the art without departing from the spirit and scope of the invention.

What is claimed is:

1. A communication system comprising a plurality of lines, a coder and decoder associated with each of said lines and means for transferring signals between pairs of said lines in communication comprising means for scanning said lines in communication in sequence in repetitive cycles, means for delaying said scan for a predetermined time upon receipt by said scanner of a first coded signal from the coder associated with one of said lines currently being scanned and means for enabling the application to the coder of said one line currently being scanned and the decoder of the line in communication with said one line of a second coded signal corresponding to said first signal during said predetermined time.

2. A telephone system comprising a plurality of lines and means for achieving signal transfers between a pair of said lines in communication during repetitive cycles of operation involving all lines in communication comprising means for receiving signals from each of said lines simultaneously, means for identifying each of said lines in communication in sequence during each cycle of operation and means operative upon receipt of a signal from a currently identified line for generating a signal corresponding to said currently identified line signal in the line with which said currently identified line is in communcation.

3. A communication system comprising a plurality of stations, means associated with each of said stations for coding intelligence signals received from said associated station and for decoding coded intelligence signals and means for realizing a signal transfer between first and second ones of said stations comprising means responsive to receipt of a coded intelligence signal from said first station coding means for enabling said first station coding means and said second station decoding means to store a quantity of charge and means operative thereafter for activating said first station coding means and said second station decoding means to reduce said stored quantity of charge to a level corresponding to said coded intelligence signal.

4. A communication system in accordance with claim 3 wherein said coding means comprises a difference amplifier receiving intelligence signals at one input, means for storing said quantity of charge, an integrating capacitor, means responsive to the output of said difference amplifier and said enabling means to store said quantity of charge in said integrating capacitor, means responsive to said activating means to subtract a portion of said stored quantity of charge from said integrating capacitor and means for connecting said integrating capacitor to another input of said difference amplifier.

5. A communication system in accordance with claim 3 wherein said enabling means comprises means operative in the absence of said coded intelligence signal for inhibiting the storage of said quantity of charge.

6. A communication system in accordance with claim 5 wherein said enabling means comprises means storing the identity of each pair of said stations in communication, means for retrieving said identities from said storage means in sequence and means operative in the presence of an intelligence signal from one of the pair of stations comprising said first and second stations, the identities of which are currently being retrieved from said storing means, for applying an enabling signal to the coding means associated with said one station and to the decoding means associated with the other station in said pair of stations and means operative at the end of a complete cycle through the station identities contained in said storing means to apply an enabling signal to the coding and decoding means associated with all of the stations having identities contained in said storing means.

7. A signal transfer system comprising a plurality of stations, apparatus associated with each of said stations for coding intelligence signals received from said station and for decoding coded intelligence signals derived from another of said plurality of stations, a control circuit comprising a memory unit storing designations of said stations, and a circuit for scanning the stored designations in sequence and for applying control signals to said apparatus in response to receipt of the corresponding stations designations from said memory unit, characterized in that the frequency of application of control signals to said apparatus associated with a particular one of said stations varies according to the detection in said apparatus of a particular coded intelligence signal from said particular station.

8. A signal transfer system in accordance with claim 7, characterized in that a time slot in a repetitive cycle is assigned to said particular station only upon detection of said particular signal in said apparatus associated with said particular station.

9. A signal transfer system in accordance with claim 7, characterized in that said scanning is inhibited upon detecton of a particular coded intelligence signal, and a first charge is applied to the coding apparatus associated with the calling station from which said coded intelligence signal is derived and to the decoding apparatus associated with the called station to which said coded intelligence signal is directed.

10. A signal transfer system in accordance with claim 7, characterized in that at the end of a scanning cycle a second charge less than that first charge is subtracted from the apparatus associated with each of said stations, the net effect being to realize a transfer of said intelligence signal between the stations in communication by providing a charge in said associated apparatus correspondng to said coded intelligence signal at the end of said scanning cycle.

11. A signal transfer system in accordance with claim 9, characterized in that, between successive scans of said calling station identity, said first charge corresponding to said coded intelligence signal is removed from said associated apparatus.

12. A communication system comprising a plurality of stations, a coder and a decoder associated with each of said stations, a memory containing coder and decoder addresses for each pair of stations in communication and a scanner for retrieving said addresses from said memory in a regular sequence, characterized in that intelligence signals are transferred through the system from a first station to a second station by utilizing said second station decoder address as retrieved from said memory concurrent with receipt in said scanner of a first coded intelligence signal from said first station coder to generate in said second station decoder a second coded intelligence signal corresponding to said first coded intelligence signal.

13. A communication system in accordance with claim 12, characterized in that intelligence signals from said first station are coded in binary form by utilizing said first station coder address as retrieved from said memory concurrent with receipt in said scanner of said first coded intelligence signal from said first station to modify said second coded intelligence signal in said first station coder and by comparing the next produced first intelligence signal and said second coded intelligence signal in said first station coder.

14. A communication system in accordance with claim 13, characterized in that said memory comprises means for stopping the sequential scanning of said memory to generate said second coded intelligence signal only upon receipt in said scanner of a first coded intelligence signal coded in one binary form.

15. A communication system in accordance with claim 14, characterized in that upon completion of each memory scan, said scanner activates each of said coders and decoders to generate a third coded intelligence signal matching one binary form of the first coded intelligence signal.

16. A communication system in accordance with claim 15, characterized in that a coded intelligence signal matching a first coded intelligence signal of the other binary form is provided by said scanner activating each of said coders and decoders at the end of a memory scan to alter said second coded intelligence signal generated during said scan.

17. A communication system comprising a plurality of stations, a coder and decoder associated with each of said stations, a plurality of memory units each containing coder and decoder addresses, means for retrieving said addresses from one of said memory units in a repetitive sequence and means for transferring intelligence signals through said system from a first station to a second station comprising means operative upon receipt in said scanner of a coded intelligence signal from said first station coder concurrent with retrieval of said second station decoder address from said one memory unit for applying a control pulse to said second station decoder, and means in said second station decoder operative upon receipt of said control pulse to generate a signal corresponding to said intelligence signal and to apply said generated signal to said second station.

18. A communication system in accordance with claim 17 wherein said coders are arranged in distinct groups, said coder addresses contained in said one memory unit being selected only from a corresponding group of said coders.

19. A communication system in accordance with claim 18 wherein said decoders are arranged in distinct groups, and further comprising group translating means for directing said control pulse to said decoder group containing said second station decoder and means for inhibiting the concurrent application of control signals to said decoder group from scanners associated with others of said memory units.

20. An asynchronous time division communication system comprising a plurality of lines, memory means for storing addresses of pairs of lines in communication, and coder and decoder means for each of said lines, said coder and decoder means including an integrating capacitor, means for transferring to said capacitor an incremental charge larger than a single unit charge if an increasing signal is present on a line during a particular cycle of the time division system, and means for causing the charge on said capacitor to decrease during each cycle of the time division system.

21. An asynchronous time division communication system in accordance with claim 20 wherein said means for causing said charge to decrease includes means for transferring to said capacitor an incremental charge of opposite sign to and smaller than the priorly transferred charge at the end of each said cycle.

22. An asynchronous time division communication system in accordance with claim 20 wherein said means for causing said charge to decrease includes a bleeder resistance in shunt with said capacitor.

References Cited

UNITED STATES PATENTS 3,202,767 8/1965 Warman.

KATHLEEN H. CLAFFY, Primary Examiner

T. W. BROWN, Assistant Examiner

U.S. Cl. X.R.

179—15